US010723202B2

(12) United States Patent
Lattin (10) Patent No.: US 10,723,202 B2
(45) Date of Patent: Jul. 28, 2020

(54) SYSTEMS AND METHODS FOR COORDINATED CONTROL OF MULTIPLE TRANSPORT REFRIGERATION SYSTEMS (71) Applicant: THERMO KING CORPORATION, Minneapolis, MN (US)

(72) Inventor: Robert Michael Lattin, Minneapolis, MN (US)

(73) Assignee: Thermo King Corporation, Minneapolis, MN (US)

(*) Notice: Subject to any disclaimer, the term of this patent is extended or adjusted under 35 U.S.C. 154(b) by 295 days.

(21) Appl. No.: 15/941,804

(22) Filed: Mar. 30, 2018

(65) Prior Publication Data
US 2019/0299749 A1 Oct. 3, 2019

(51) Int. Cl.
B60H 1/32 (2006.01)
B60H 1/00 (2006.01)
F25B 49/02 (2006.01)
F25B 27/00 (2006.01)

(52) U.S. Cl.
CPC ......... B60H 1/3208 (2013.01); B60H 1/0045 (2013.01); B60H 1/00364 (2013.01); B60H 1/323 (2013.01); B60H 1/3232 (2013.01); F25B 27/00 (2013.01); F25B 49/022 (2013.01); B60H 2001/3266 (2013.01); B60H 2001/3273 (2013.01)

(58) Field of Classification Search
CPC .... H04W 4/005; H04W 5/0068; B60H 1/323; B60H 1/00778; B60H 1/3211; B60H 1/3232; F25B 2600/0251
See application file for complete search history.

(56) References Cited

U.S. PATENT DOCUMENTS 5,437,163 A 8/1995 Jurewicz et al.
5,487,278 A 1/1996 Hilleveld et al.
5,999,091 A 12/1999 Wortham
(Continued)

FOREIGN PATENT DOCUMENTS

WO 03021163 3/2003
WO 2008/086425 7/2008
WO 2014/055530 4/2014

OTHER PUBLICATIONS

U.S. Appl. No. 15/941,772, filed Mar. 30, 2018 (29 pages).
(Continued)

Primary Examiner — Cassey D Bauer
(74) Attorney, Agent, or Firm — Hamre, Schumann, Mueller & Larson, P.C.

(57) ABSTRACT

Methods and systems for coordinating operation of two or more transport refrigeration systems (TRSs) are disclosed. In one embodiment, the method includes a controller determining whether the first transport unit is stationary. The method also includes the controller identifying whether the first transport unit is in close proximity of a second transport unit when the controller determines that the transport unit is stationary. Also, the method includes the controller determining an executive control strategy for controlling the first TRS in coordination with a second TRS when the controller identifies that the first transport unit is in close proximity of the second transport unit. Further, the method includes the controller operating the first TRS based on the executive control strategy.

20 Claims, 4 Drawing Sheets

(56) References Cited

U.S. PATENT DOCUMENTS

| | | | |
|---|---|---|---|
| 6,067,482 | A | 5/2000 | Shapiro |
| 6,502,409 | B1 | 1/2003 | Gatling et al. |
| 6,647,735 | B2 | 11/2003 | Street et al. |
| 6,679,071 | B1 | 1/2004 | Storey et al. |
| 6,975,926 | B2 | 12/2005 | Schanin |
| 7,812,733 | B2 | 10/2010 | Perten et al. |
| 8,334,781 | B2 | 12/2012 | Heck et al. |
| 8,590,330 | B2 | 11/2013 | Walker et al. |
| 8,849,723 | B2 | 9/2014 | Robinson et al. |
| 9,342,082 | B2 | 5/2016 | Guenette et al. |
| 9,434,237 | B2 | 9/2016 | Olaleye |
| 2002/0104323 | A1 | 8/2002 | Rash et al. |
| 2006/0123807 | A1 | 6/2006 | Sullivan |
| 2007/0220907 | A1 | 9/2007 | Ehlers |
| 2008/0291850 | A1 | 11/2008 | Jensen |
| 2010/0257115 | A1 | 10/2010 | Robinson et al. |
| 2010/0274604 | A1* | 10/2010 | Crilly .................... G06Q 10/08 705/333 |
| 2011/0156877 | A1 | 6/2011 | Wong et al. |
| 2011/0276826 | A1 | 11/2011 | Schoppmeier et al. |
| 2011/0301762 | A1 | 12/2011 | Walker et al. |
| 2012/0041602 | A1 | 2/2012 | Klinger |
| 2012/0137713 | A1 | 6/2012 | Duraisamy et al. |
| 2012/0167605 | A1 | 7/2012 | Ikemiya et al. |
| 2012/0229089 | A1 | 9/2012 | Bemmel et al. |
| 2012/0278454 | A1 | 11/2012 | Stewart et al. |
| 2014/0144164 | A1 | 5/2014 | Steele et al. |
| 2015/0292784 | A1 | 10/2015 | Yamanis et al. |
| 2016/0150348 | A1* | 5/2016 | Srnec ................ H04B 5/0068 340/10.1 |
| 2016/0164288 | A1 | 6/2016 | Yang et al. |
| 2016/0253406 | A1 | 9/2016 | Schmitz |
| 2018/0186317 | A1* | 7/2018 | Srnec ........................ H02J 7/35 |
| 2019/0120530 | A1 | 4/2019 | Chopko et al. |

OTHER PUBLICATIONS

Can the Electrical Grid Handle Electric Trucks?, from http://www.truckinginfo.com/channel/fuel-smarts/article/story/2018/02/can-the-electrical-grid-handle-electric-trucks.aspx, Dated Feb. 19, 2018.

Marine power management system—K-Chief 600, from https://www.km.kongsberg.com/ks/web/nokbg0240.nsf/AllWeb/A297BDC3A79BBB36C125726B00387597?OpenDocument, Retrieved Jun. 5, 2018.

Solar power's greatest challenge was discovered 10 years ago. It looks like a duck. Found at https://www.vox.com/energy-and-environment/2018/3/20/17128478/solar-duck-curve-nrel-researcher, Dated Mar. 31, 2018.

Ship power management system, found at https://www.comap.cz/applications/detail/Ship-power-management-system/, Dated Aug. 2016.

Understanding Power Management System: How to Reduce Power Consumption on Ships, Found at http://www.marineinsight.com/tech/understanding-power-management-system-how-to-reduce-power-consumption-on-ships/, Dated Oct. 27, 2017.

11. PowerMax Solutions, Published by SEL Engineering Services, No. 385-0053, Dated 2017.

4. SAE • J2497; Jul. 30, 2012; Power Line Communications for Commercial Vehicles, Published by SAE International, Dated Jul. 2012.

* cited by examiner

SYSTEMS AND METHODS FOR COORDINATED CONTROL OF MULTIPLE TRANSPORT REFRIGERATION SYSTEMS

FIELD

The embodiments disclosed herein relate generally to transport refrigeration. More specifically, the embodiments described herein relate to a system and method of coordinating operation of two or more independent transport refrigeration systems (TRSs).

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, or other similar transport unit). A refrigerated tampon unit is commonly used to transport perishable items such as produce, frozen foods, and meat products. Generally, the refrigerated transport unit includes a transport unit and a TRS.

The TRS includes a transport refrigeration unit (TRU) that is attached to the transport unit to control one or more environmental conditions (e.g., temperature, humidity, atmosphere, etc.) of a particular space (e.g., a cargo space, a passenger space, etc.) (generally referred to as an "internal space"). The TRU can include, without limitation, a compressor, a condenser, an expansion valve, an evaporator, fans and/or blowers to control a heat exchange between air inside the internal space and the ambient air outside of the refrigerated transport unit.

SUMMARY

The embodiments disclosed herein relate generally to transport refrigeration. More specifically, the embodiments described herein relate to a system and method of coordinating operation of two or more independent TRSs.

In particular, the embodiments described herein can provide coordinated operation of two or more independent TRSs that are located in close proximity to each other.

The embodiments described herein can actively coordinate the functioning and control of independent TRSs when the TRSs are in close proximity to each other and are generally stationary (e.g., at a shipyard, warehouse, supply yard, etc.). The embodiments described herein can negotiate priority between the independent TRSs and can generate an executive control strategy, thereby optimizing a specific and desired operation of each of the TRSs, rather than each TRS acting independently. While the embodiments described herein are directed to the coordination of two or more independent TRSs, it is to be understood that the embodiments described herein can be applied to other environmental control units such as fixed refrigeration units and the like.

In one embodiment, a method of coordinating operation of a first TRS with one or more other TRSs is provided. The method includes a controller determining whether the first transport unit is stationary. The method also includes the controller identifying whether the first transport unit is in close proximity of a second transport unit when the controller determines that the transport unit is stationary. Also, the method includes the controller determining an executive control strategy for controlling the first TRS in coordination with a second TRS when the controller identifies that the first transport unit is in close proximity of the second transport unit. Further, the method includes the controller operating the first TRS based on the executive control strategy.

In another embodiment, a coordinated control system is provided. The system includes a first refrigerated transport and a controller. The first refrigerated transport unit includes a first transport unit having an internal space, and a first TRS that controls an environmental condition within an internal space of the first transport unit. The controller is configured to determine whether the first transport unit is stationary, identify whether the first transport unit is in close proximity of a second transport unit when the controller determines that the first transport unit is stationary, and determine an executive control strategy for controlling the first TRS in coordination with a second TRS of a second refrigerated transport unit when the controller identifies that the first transport unit is in close proximity of the second transport unit. Also, the TRS is configured to control the environmental condition within the transport unit based on the executive control strategy.

In yet another embodiment, a TRS for controlling an environmental condition within an internal space of a transport unit is provided. The TRS includes a refrigeration circuit and a controller. The refrigeration circuit includes a refrigerant compressor that is operable to be powered by a utility/shore power source. The controller is configured to determine whether the transport unit is stationary, identify whether the transport unit is in close proximity of a second transport unit when the controller determines that the transport unit is stationary, determine an executive control strategy for controlling the TRS in coordination with a second TRS when the controller identifies that the transport unit is in close proximity of the second transport unit, and control operation of the refrigeration circuit based on the executive control strategy.

Other aspects of the invention will become apparent by consideration of the detailed description and accompanying drawings.

DESCRIPTION OF THE DRAWINGS

Referring now to the drawings in which like reference numbers represent corresponding parts throughout.

DETAILED DESCRIPTION

The embodiments disclosed herein relate generally to transport refrigeration. More specifically, the embodiments described herein relate to a system and method of coordinated operation of two or more independent TRSs.

In particular, the embodiments described herein can provide coordinated operation of two or more independent TRSs that are located in close proximity to each other.

The embodiments described herein can actively coordinate the functioning and control of independent TRSs when the TRSs are in close proximity to each other and are generally stationary (e.g., at a shipyard, warehouse, supply yard, etc.). The embodiments described herein can negotiate priority between the independent TRSs and can determine an executive control strategy, thereby optimizing a specific and desired operation of each of the TRSs, rather than each TRS acting independently. While the embodiments described herein are directed to the coordination of two or more independent TRSs, it is to be understood that the embodiments described herein can be applied to other environmental control units such as fixed refrigeration units and the like.

References are made to the accompanying drawings that form a part hereof, and in which is shown by way of illustration of the embodiments in which the methods and systems described herein may be practiced.

As used herein, the term "refrigerated transport unit" refers to a transport unit in which air within an internal space of the transport unit is conditioned so as to maintain a desired environmental condition (e.g., temperature, humidity, atmosphere, etc.). The term "transport unit" generally refers to, for example, a container (such as a container on a flat car, an intermodal container, etc.), a truck, a box car, or other similar transport unit. The term "transport refrigeration system" or "TRS" refers to a refrigeration system for controlling an environmental condition of an internal space of the refrigerated transport unit. The term "internal space" refers to a space or zone within the transport unit that receives the conditioned air.

As defined herein, two devices (e.g., TRS controllers) are considered to be in "close proximity" when the two devices are able to establish short wireless communication with each other (directly) or can establish communication via a chain of remote devices that are directly in close proximity.

It will be appreciated that the embodiments described herein may be used with any suitable refrigerated transport unit. It is to be understood that the present disclosure is not limited to a single application and could find other more general uses for collectively operating two or more independent TRSs that are located in a close proximity.

Figure 1:
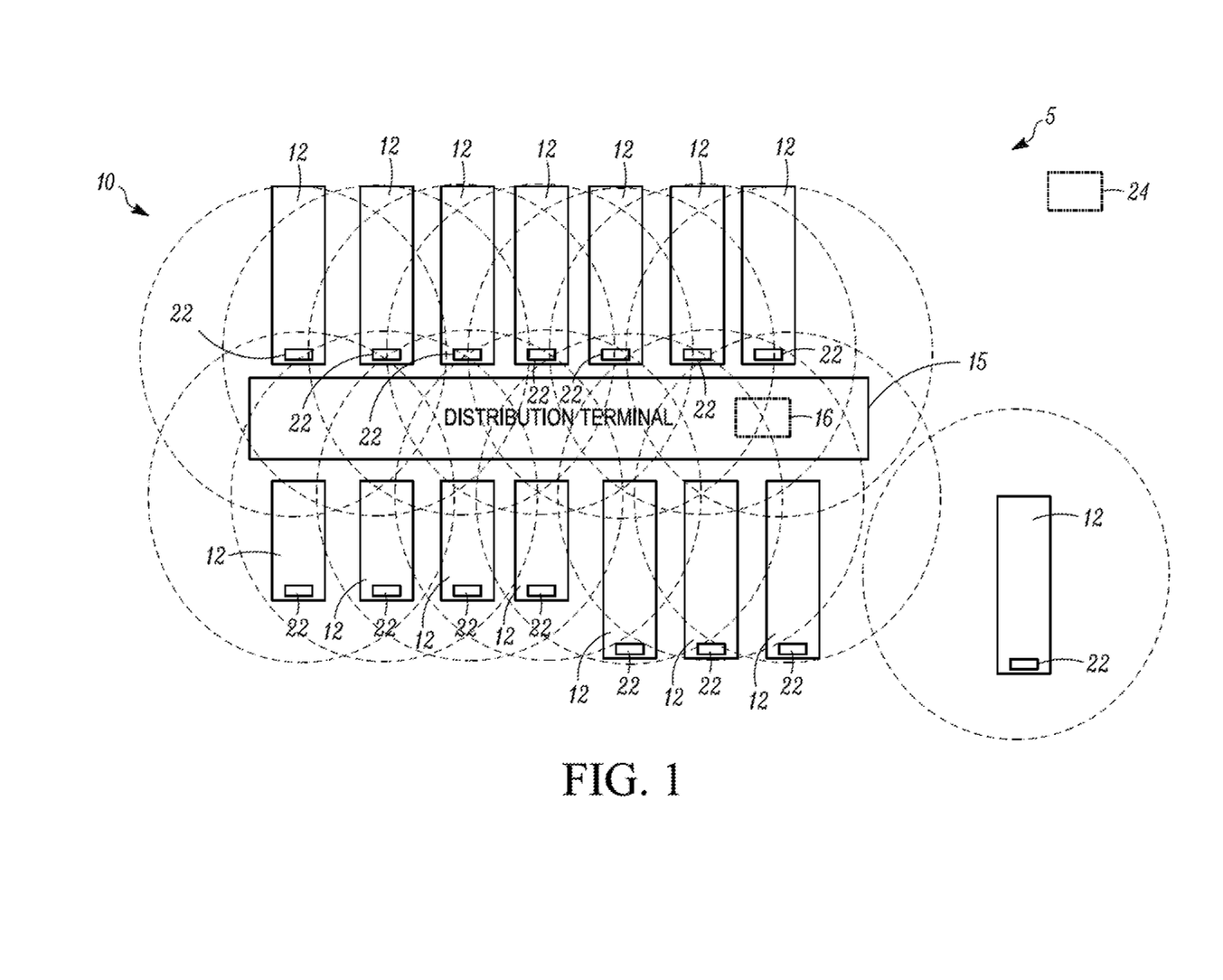
FIG. 1 illustrates a schematic view of an operation site temporarily housing a plurality of refrigerated transport units and employing a coordinated control system, according to one embodiment.

FIG. 1 illustrates a schematic view of an operation site 5 temporarily housing a plurality of refrigerated transport units 12 at a distribution terminal 15 and employing a coordinated control system 10, according to one embodiment.

Each of the plurality of refrigerated transport units 12 is generally located in close proximity relative to at least one other refrigerated transport unit 12 at the operation site 5. Each of the plurality of refrigerated transport units 12 can generally remain stationary at their respective location when housed at the operation site 5.

Generally, the operation site 5 can be any location where two or more refrigerated transport units 12 are temporarily housed. The operation site 5 can be, for example, a distribution center, a shipyard, a warehouse, a supply yard, a farm, a manufacturing/production facility, a retail store, etc.

The distribution terminal 15 can provide utility/shore power from a utility/shore power source for powering one or more of the refrigerated transport units 12. It will be appreciated that the cost for powering one or more of the refrigerated transport units 12 using utility/shore power can vary based on the time of day that the power is drawn. For example, utility/shore power from the utility/shore power source can be cheaper at night than during the day. There can also be periods of time during the day that the power demand from the utility/shore power source can be greater than at other periods of time during the day. At these peak power demand times, the cost of the utility/shore power can be higher than at other time periods of the day.

Each of the refrigerated transport units 12 can be, for example, a transport refrigeration system (TRS) (not shown) combined with one of a container (such as a container on a flat car, an intermodal container, etc.), a truck, a box car, or other similar transport unit. The TRS can control an environmental condition (e.g., temperature, humidity, atmosphere, etc.) within an internal space of the transport unit. The TRS of each of the refrigerated transport units 12 can be powered by, for example, a prime mover (e.g., diesel engine), a utility/shore power source, a fuel cell, a solar power source, a wind power source, a battery power source, an auxiliary power unit (APU), etc. One embodiment of a refrigerated transport unit is discussed below with respect to FIG. 2.

The TRS of each of the plurality of refrigerated transport units 12 includes a controller 22. The controller 22 can include a telematics device (not shown) that is configured to communicate with one or more remote devices such as, for example, one or more of the other controllers 22 of the refrigerated transport units 12.

In some embodiments, the telematics device can communicate with one or more remote devices (e.g., a controller 22 of another refrigerated transport unit 12) using, for example, a short distance wireless communication protocol such as, for example, ZigBee, Bluetooth, infrared, a radio enabled protocol, a power line communication protocol, a Wi-Fi protocol, etc. In some embodiments, the telematics device can communicate with one or more remote devices using, for example, a long distance wireless communication protocol such as, for example, a cellular communication protocol, etc.

As shown by the circles in FIG. 1, each of the controllers 22 has a radius in which the controller 22 can establish short distance wireless communication with a remote device. As defined herein, a refrigerated transport unit 12 is in close proximity with a remote device when the controller 22 of the refrigerated transport unit 12 can establish short distance wireless communication with the remote device.

The coordinated control system 10 is configured to actively coordinate the functioning and control of the refrigerated transport units 12 when they are in close proximity relative to each other and are generally stationary. The coordinated control system 10 includes the controller 22 from one or more of the refrigerated transport units 12. In some embodiments, the coordinated control system 10 can also include an optional operation site control center 16 and/or an optional remote control center 24.

As discussed in more detail below, the controller 22 of one of the refrigerated transport units 12 can negotiate priority and/or establish a set of operation rules (herein referred to as an executive control strategy) between two or more of the refrigerated transport units 12 at the operation site 5. This can allow two or more of the refrigerated transport units 12 to operate in coordination with each other rather than operating independently. While the controller 22 of one of the refrigerated transport units 12 may not be in direct close proximity with all of the other controllers 22 of the refrigerated transport units 12, it will be appreciated that once an executive control strategy is created the controller 22 can send the executive control strategy to each of the other controllers 22 that are in close proximity to controller 22. Those controllers 22 can then relay the executive control strategy to other controllers 22 of other refrigerated transport units 12 that are in close proximity. For example, in some embodiments, a controller 22 that receives an executive control strategy from another controller 22 can then relay the executive control strategy to other controllers 22. Accordingly, the executive control strategy can be sent to each of the refrigerated transport units 12 located at the operation site 5. Also, each of the controllers 22 at the operation site 5 can be considered to be indirectly in close proximity even if one of the controllers 22 may not be in direct close proximity with another of the controllers 22.

The optional control center 16 is located at the distribution terminal 15 and can communicate with one or more of the controllers 22. In some embodiments, the optional control center 16 can be located at the operation site 5 but be separate from the distribution terminal 15. The optional remote control center 24 is located away from the operation site 5 and can communicate with one or more of the controllers 22. In some embodiments, the optional control center 16 and/or the optional remote control center 24 can generate an executive control strategy between two or more of the refrigerated transport units 12. This can allow two or more of the refrigerated transport units 12 to operate in coordination with each other rather than operating independently.

An advantage of the coordinated control system 10 is that operation of each of the independent refrigerated transport units 12 can be controlled to collectively optimize behavior of the refrigerated transport units 12. In some embodiments, the coordinated control system 10 can coordinate power usage of each of the refrigerated transport units 12. For example, the refrigerated transport units 12 can be collectively controlled to optimize utility/shore power demand by all of the refrigerated transport units 12.

Accordingly, the refrigerated transport units 12 can be prevented from starting simultaneously to preserve a power factor of the utility/shore power demand. Also, operation of the refrigerated transport units 12 can be controlled to lower utility/shore power usage when utility/shore power from the utility/shore power source is more expensive and/or increase utility/shore power usage when the utility/shore power from the utility/shore power source is cheaper. Further, the price of utility/shore power (e.g., energy rate) from the utility/shore power source can be monitored in real-time and the refrigerated transport units 12 can be collectively controlled based on the real-time monitoring to reduce the cost for providing utility/shore power to the refrigerated transport units 12. Moreover, the amount of noise at the operation site 5 can be reduced by controlling, for example, the number of refrigerated transport units 12 that can operate at a particular time, the number of refrigerated transport units 12 that can use a prime mover at a particular time, etc.

Figure 2:
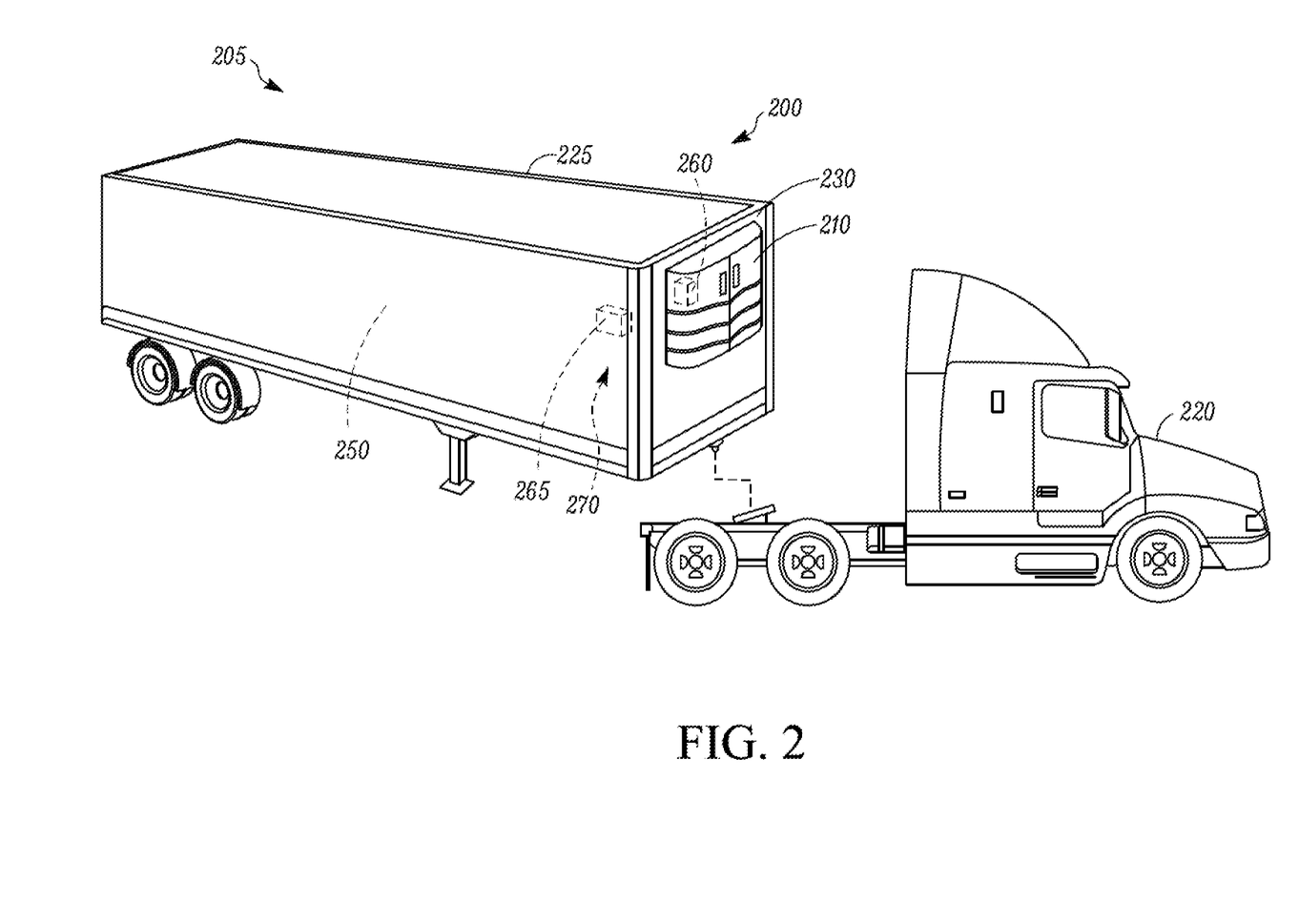
FIG. 2 illustrates a refrigerated transport unit that is attached to a tractor, according to one embodiment.

FIG. 2 illustrates one embodiment of a refrigerated transport unit 205 attached to a tractor 220. The refrigerated transport unit 205 includes a TRS 200 for a transport unit (TU) 225. The tractor 220 is attached to and is configured to tow the transport unit 225. The transport unit 225 shown in FIG. 2 is a trailer. It will be appreciated that the embodiments described herein are not limited to tractor and trailer units, but can apply to any type of transport unit (e.g., a container on a flat car, an intermodal container, etc.), a truck, a box car, or other similar transport unit.

The TRS 200 includes a transport refrigeration unit (TRU) 210 that provides environmental control (e.g. temperature, humidity, air quality, etc.) within an internal space 250 of the TU 225. The TRS 200 also includes a TRS controller 270 and one or more sensors (not shown) that are configured to measure one or more parameters of the TRS 200 and communicate parameter data to the TRS controller 270.

The TRU 210 is disposed on a front wall 230 of the TU 225. In other embodiments, it will be appreciated that the TRU 210 can be disposed, for example, on a rooftop or another wall of the TU 225.

The programmable TRS Controller 270 may comprise a single integrated control unit 260 or that may comprise a distributed network of TRS control elements 260, 265. The number of distributed control elements in a given network can depend upon the particular application of the principles described herein. The TRS controller 270 is configured to control operation of the TRS 200. The TRS controller 270 can also provide coordinated operation of the TRS 200 with one or more other independent TRSs (as shown in FIG. 1) that are located in close proximity to each other.

One embodiment of the TRU 210 is discussed below with respect to FIG. 3.

Figure 3:
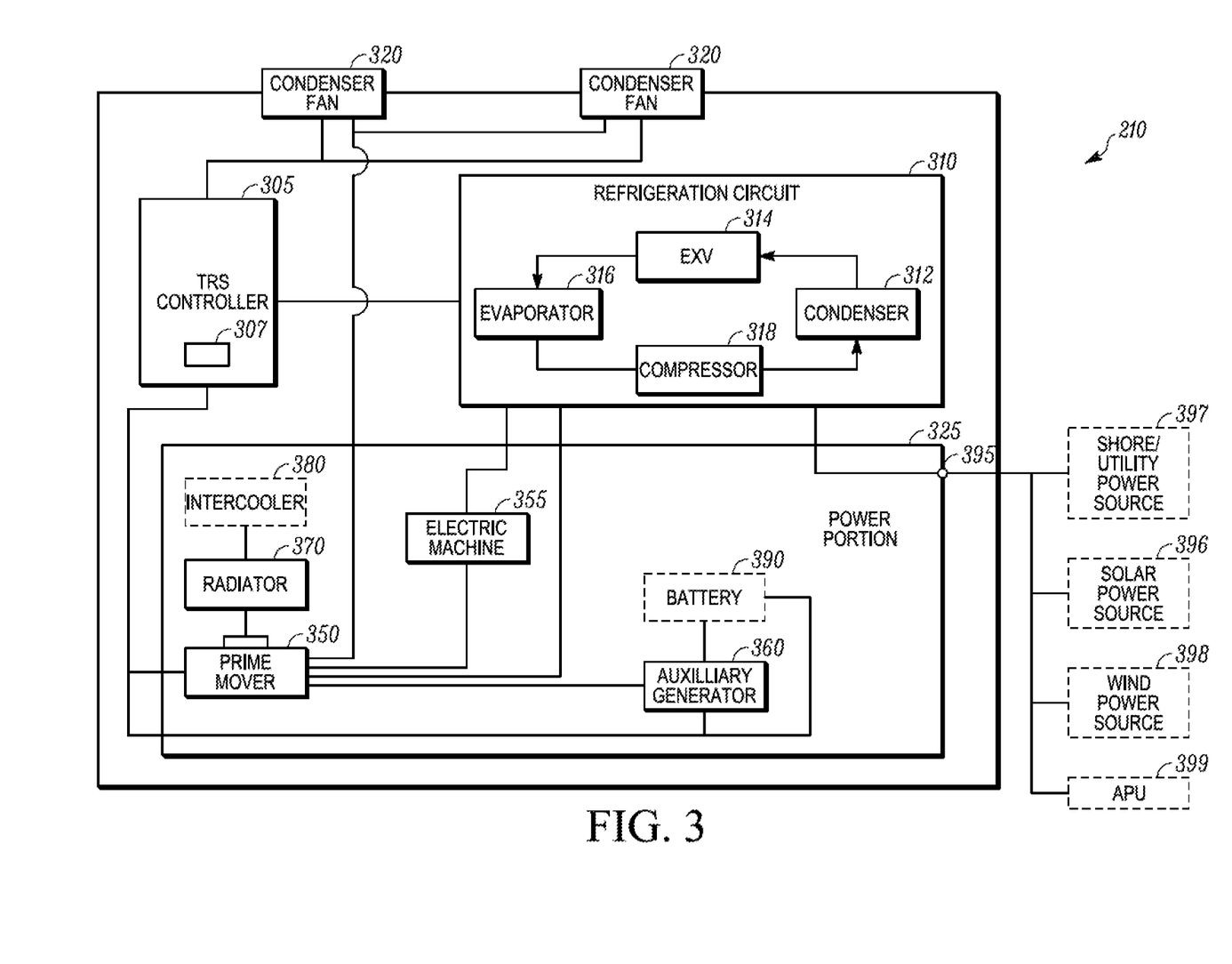
FIG. 3 illustrates a block diagram of a TRU of a TRS, according to one embodiment.

FIG. 3 illustrates one embodiment of a block diagram of components within the TRU 210 shown in FIG. 2. The TRU 210 includes a TRS Controller 305, a refrigeration circuit 310, two condenser fans 320, and a power portion 325.

The refrigeration circuit 310 regulates one or more environmental conditions (e.g., temperature, humidity, atmosphere, etc.) of an internal space of a transport unit (e.g., the TU 225 shown in FIG. 2) based on instructions received from the TRS Controller 305. The refrigeration circuit 310 includes a condenser 312, an expansion valve (EXV) 314, an evaporator 316 and a compressor 318 that together provide temperature control to the internal space and any cargo stored therein. The condenser 312 is in airflow communication with the condenser fans 320.

The refrigeration circuit 310 can be operated in multiple modes including, for example, a continuous operation mode where the compressor 318 is run continuously, a cycle-sentry mode where the compressor 318 cycles between being turned on for a first period of time and then being turned off for a second period of time, and a null mode whereby the compressor 318 is turned off but other components of the TRS 200 (e.g., condenser fan(s), evaporator blower(s), etc.) remain on.

In some embodiments, the compressor 318 is a mechanically driven compressor that is powered by a prime mover 350. In some embodiments, the compressor is an electrically driven compressor that is powered by, for example, an electric machine 355, a shore/utility power source 397, etc. In some embodiments, the compressor 318 can be both mechanically and electrically powered.

The power portion 325 provides power to the TRU 210 and other components of the TRS 200. The power portion 325 includes the prime mover 350, the electric machine 355, an auxiliary generator 360, a radiator 370, an optional intercooler 380, an optional battery 390, and a power connection 395.

The prime mover 350 is configured to provide mechanical power to the auxiliary generator 360. In some embodiments, the prime mover 350 can provide mechanical power to one or more components of the TRS 200 including, for example, components of the refrigeration circuit 310 (e.g., the compressor 318) and the condenser fans 320. In some embodiments, the prime mover 350 can be an engine (e.g., a diesel combustion engine). Also, in some embodiments, the prime mover 350 can be an electronically controlled engine that includes an electronic control unit (not shown) that can communicate with the TRS Controller 305. In some embodiments, the prime mover 350 can be a two speed engine. In other embodiments, the prime mover 350 can be a variable speed engine.

The electric machine 355 is connected to the prime mover 350 and can be configured to convert mechanical power from the prime mover 350 into AC electrical power that can be used, for example, to power one or more AC loads (e.g., the compressor 318, one or more induction machines, one or more resistor grids, one or more condenser fans, one or more evaporator blowers, a drain tube heater, etc.) within the TRS 200.

The auxiliary generator 360 and the optional battery 390 (when present) are configured to provide DC electrical power to components of the TRS 200 including, for example, the TRS Controller 305. In some embodiments, the auxiliary generator 360 can be an alternator. In some embodiments, the auxiliary generator 360 can be a permanent magnet machine. In some embodiments, when the auxiliary generator 360 is a permanent magnet machine, the prime mover 350 can provide mechanical power to the auxiliary generator 350 and mechanical power to the compressor 318. In some embodiments, the auxiliary generator 360 can provide three phase AC power to one or more AC loads (e.g., one or more induction machines, one or more resistor grids, one or more condenser fans, one or more evaporator blowers, a drain tube heater, etc. within the TRS 200. Also, in some embodiments, the auxiliary generator 360 can be configured to recharge the optional battery 390.

In some embodiments, the optional battery 390 can provide DC power to one or more DC loads (e.g., one or more sensors, one or more third party devices, a telematics unit, a data logger device, charger for charging a battery, one or more solenoids, one or more DC powered motors, etc.) of the TRS 200. In some embodiments, the optional battery 390 can be a ~12 volt battery.

The power connection 395 is configured to allow the TRU 210 to connect to a secondary power source such as the shore/utility power source 397, a solar power source 396, a wind power source 398, and an auxiliary power unit (APU) 399. It will be appreciated that the secondary power source can include other power sources not listed above such as, for example, a fuel cell, a battery power source, etc. In some embodiments, the power connection 395 can allow the shore/utility power source 397 to provide three phase AC power to one or more AC loads including the compressor 318. In some embodiments, the power connection 395 can allow the solar power source 396 to provide to provide three phase AC power to one or more AC loads including the compressor 318. In some embodiments, the power connection 395 can allow the wind power source 397 to provide three phase AC power to one or more AC loads including the compressor 318. In some embodiments, the power connection 395 can allow the APU 399 to provide three phase AC power to one or more AC loads including the compressor 318.

The radiator 370 is configured to transfer heat away from the prime mover 350. In some embodiments, the radiator 370 is in airflow communication with the condenser fans 320. The optional intercooler 380 is configured to transfer heat away from the compressor 318.

The TRS Controller 305 is connected to and configured to control the refrigerant circuit 310, two condenser fans 320 and the power portion 325. The TRS Controller 305 controls the refrigeration circuit 310 to obtain one or more environmental conditions (e.g., temperature, humidity, atmosphere, etc.) of an internal space (e.g., the internal space 250 shown in FIG. 2) of a transport unit and can be powered by the power portion 325 and/or another power source (not shown).

The TRS controller 305 includes a telematics device 307 configured to receive and store information regarding the TRS 200. The telematics device 307 is also configured to communicate with one or more remote devices such as, for example, one or more telematics devices of other independent TRSs. The telematics device 307 can store priority information including for example, the value of cargo stored in the refrigerated transport unit, the amount of energy required for the refrigerated transport unit to reach a desired environmental condition (temperature, humidity, atmosphere, etc.), subcooling availability, solar power source availability, wind power source availability, APU power availability, etc. In some embodiments, a user can input cargo information (e.g., the value of cargo stored in the refrigerated transport unit, subcooling availability for the cargo, desired environment condition range (e.g., temperature range, humidity range, atmosphere range, etc.) for the cargo stored in the refrigerated transport unit, etc.). In some embodiments, the cargo information can inputted into the telematics device 307 using, for example, radio frequency identification (RFID) communication between the cargo and the telematics device 307.

In some embodiments, the telematics device 307 can communicate with one or more remote devices using, for example, a short distance wireless communication protocol such as, for example, ZigBee, Bluetooth, infrared, a radio enabled protocol, a power line communication protocol, a Wi-Fi protocol, etc. In some embodiments, the telematics device 307 can communicate with one or more remote devices using, for example, a long distance wireless communication protocol such as, for example, a cellular communication protocol, etc. While the telematics device 307 is shown as part of the TRS controller 305 it will be appreciated that in other embodiments, the telematics device 307 can be separate from and connected to the TRS controller 305.

In some embodiments, the telematics device 307 can identify and recognize a telematics device of another TRS. Accordingly, the telematics device 307 can be used to provide coordinated operation of the TRS 200 with one or more other independent TRSs (as shown in FIG. 1) that are located in direct or indirect close proximity to each other. One embodiment of a method of coordinating operation of the TRS 200 with one or more independent TRSs is discussed below with respect to FIG. 4.

Figure 4:
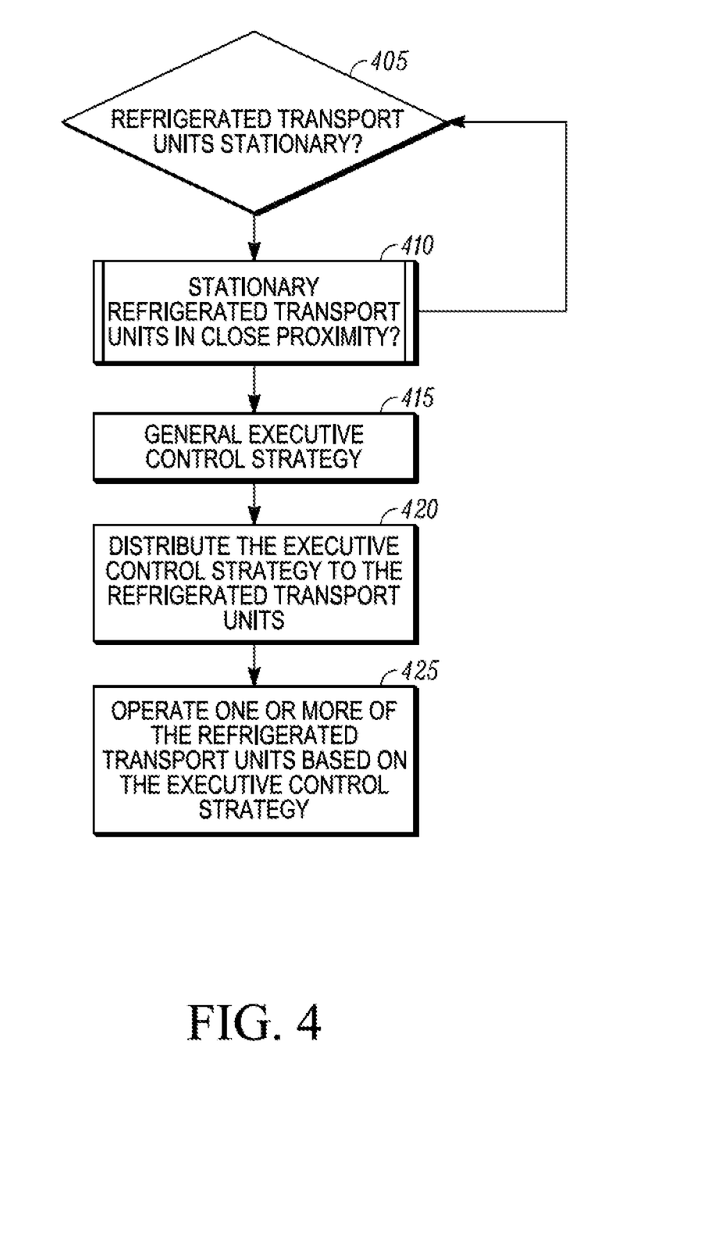
FIG. 4 illustrates a flow chart of a method for coordinating operation of a TRS with one or more other TRSs, according to one embodiment.

FIG. 4 illustrates a flow chart of a method 400 for coordinating operation of two or more of the refrigerated transport units 12 using the coordinated control system 10. The method 400 is implemented by a single controller. However, it will be appreciated that in other embodiments, the method 400 can be implemented by multiple controllers that may be located in multiple locations. In some embodiments, the controller can be a TRS controller (e.g., the TRS controller 307 shown in FIG. 3) of the first refrigerated transport unit. In some embodiments, the controller can be part of a control center (e.g., the optional control center 16 shown in FIG. 1, the optional remote control center 24 shown in FIG. 1, etc.) that is separate from the refrigerated transport units 12.

The method 400 begins at 405, whereby a controller determines whether a first refrigerated transport unit of the two or more refrigerated transport units 12 is stationary. When the controller is a TRS controller of the first refrigerated transport unit, the TRS controller can determine that the first refrigerated transport unit is stationary based on, for example, one or more sensors connected to the TRS of the first refrigerated transport unit, monitoring a global positioning system (GPS) signal of the first refrigerated transport unit, etc. When the controller is part of a control center, the control center can determine that the first refrigerated transport unit is stationary based on, for example, a communication signal sent from the TRS controller of the first refrigerated transport unit to the control center indicating the location of the first refrigerated transport unit, monitoring a GPS signal of the first refrigerated transport unit, etc. If the controller determines that the first refrigerated transport unit is stationary, the method 400 then proceeds to 410. If the controller determines that the first refrigerated transport unit is not stationary, the method 400 then proceeds back to 405.

At 410, the controller waits for the first refrigerated transport unit to be in close proximity, either directly or indirectly, to other refrigerated transport unit(s). When the controller is a TRS controller of the first refrigerated transport unit, the TRS controller can determine that the first refrigerated transport unit is in close proximity to other refrigerated transport unit(s) based on, for example, whether the TRS controller is able to establish short distance wireless communication (directly or indirectly) with the other refrigerated transport unit(s). When the controller is part of a control center, the control center can determine that the first refrigerated transport unit is in close proximity (directly or indirectly) to other refrigerated transport unit(s) based on, for example, monitoring a GPS signal of the first refrigerated transport unit and GPS signals) of the other refrigerated transport unit(s), information received from the refrigerated transport units, etc. When the controller determines that the first refrigerated transport unit is in close proximity to other refrigerated transport unit(s), the method 400 then proceeds to 415.

At 415, the controller generates an executive control strategy for coordinating operation of the operating the first refrigerated transport unit and the other refrigerated transport unit(s). The executive control strategy can optimize operation of the refrigerated transport units. In some embodiments, the executive control strategy can negotiate priority between each of the refrigerated transport units based on a variety of priority information including, for example, the value of cargo stored in each of the refrigerated transport units, the amount of energy required for each of the refrigerated transport units to reach a desired environmental condition (temperature, humidity, atmosphere, etc.), real time energy rates of utility/shore power, regulation requirements (e.g., noise requirements) at the operation site, operation site rules, subcooling availability, time of day at the operation site, solar power source availability, wind power source availability, APU power availability, etc. Whether the controller is a TRS controller of the first refrigerated transport unit or a part of a control center, the controller can obtain the priority information from a variety of locations including, for example, a control center, another TRS controller, etc.

The following are non-limiting examples of aspects of an executive control strategy. It will be appreciated that one or more of these examples (and other examples not described below) may be combined to form the executive control strategy.

For example, the executive control strategy can include determining a priority of the refrigerated transport units that can, for example, be turned on, use a utility/shore power source, etc. at any particular time. In some embodiments, the priority of the refrigerated transport units can be based on the amount of energy required by each of the refrigerated transport units to reach a desired set point temperature within its internal space. In some embodiments, the priority of the refrigerated transport units can be based on the value of cargo stored within the internal space of each of the refrigerated transport units. In some embodiments, the priority of the refrigerated transport units can be based on the how narrow a band of environmental control in the internal space is required for each of the refrigerated transport units. In some embodiments, the priority of the refrigerated transport units can be based on a combination of the embodiments described in this paragraph.

In another example, the executive control strategy can include preventing simultaneous startup of two or more TRSs when the two or more TRSs are being powered by the utility/shore power source. This can prevent the site (e.g., operation site) providing the utility/shore power source from an inrush current caused by two or more TRSs starting up simultaneously. In one embodiment, the executive control strategy can instruct the first TRS to startup and instruct the second TRS to wait a certain period of time (e.g., 10 seconds) before starting up in order to prevent the inrush current.

In another example, the executive control strategy can include staggering operation of a cycle-sentry mode between multiple refrigerated transport units when these refrigerated transport units are being powered by the utility/shore power source. Accordingly, the executive control strategy can reduce the amount of time multiple refrigerated transport units are turned on at the same time, thereby reducing the amount of load at the site providing the utility/shore power at any particular time. That is, exceeding a capacity power usage of the utility/shore power source that the site can provide can be prevented and a peak power demand of the utility/shore power source can be reduced. This can also reduce the amount of noise at any particular time at the site as the number of refrigerated transport units that have the compressor running at a particular time is reduced.

In another example, the executive control strategy can include instructing one or more of the refrigerated transport units to switch from the utility/shore power source to another power source (e.g., a prime mover, a solar power source, a wind power source, a fuel cell power source, a battery power source, an APU, etc.) to allow other refrigerated transport unit(s) to be powered by the utility/shore power source. In some embodiments, this can include the executive control strategy instructing, for example, five of twenty refrigerated transport units to use the utility/shore power source at a particular time and instructing the remaining fifteen refrigerated transport units to remain off or use another power source.

In another example, the executive control strategy can include instructing one or more of the refrigerated transport units to not use the utility/shore power source when the site determines that conservation of utility/shore power is desired or required. The one or more refrigerated transport units can, if required, use another power source (e.g., a prime mover, a solar power source, a wind power source, a fuel cell power source, a battery power source, an APU, etc.).

In another example, the executive control strategy can include coordinating operation of the refrigerated transport units based on the cost of using utility/shore power at the site at a particular time (e.g., the energy rate). That is, the executive control strategy can instruct one or more of the refrigerated transport units to use the utility/shore power source when the cost for the utility/shore power source at a particular time is lower than a determined cost threshold, and can instruct the one or more refrigerated transport units to use another power source (e.g., a prime mover, a solar power source, a wind power source, a fuel cell power source, a battery power source, an APU, etc.) when the cost for the utility/shore power source at the site at a particular time is greater than the determined cost threshold. In some embodiments, the executive control strategy can use a real time energy rate of the utility/shore power source at the site to determine the cost for the utility/shore power source at a particular time.

In another example, the executive control strategy can include determining whether there are any refrigerated transport units at the site that include cargo that can be subcooled. Based on this determination, the executive control strategy can include instructing one or more of the refrigerated transport units that can be subcooled to use, for example, the utility/shore power source at a time when the cost for the utility/shore power source is below a cost threshold (e.g., at night) to subcool its cargo so that the refrigerated transport unit(s) can remain off during periods of time when the cost for the utility/shore power source is higher than a cost threshold (e.g., during the day).

In another example, the executive control strategy can include determining whether there are any refrigerated transport units at the site that include cargo that can allow a greater environmental variation within its internal space (e.g., a wide range of acceptable temperature values within the internal space). Based on this determination, the executive control strategy can include instructing the one or more refrigerated transport units that can allow a greater environmental variation within its internal space to not use the utility/shore power source during periods of time when the cost for the utility/shore power source is higher than a cost threshold.

In another example, the executive control strategy can include limiting the number of refrigerated transport units that can use a prime mover at a particular time in order to reduce noise at the operation site. In one embodiment, the executive control strategy can allow only five of twenty refrigerated transport units to use the prime mover at a particular time. If desired or required, the remaining fifteen refrigerated transport units can use another power source (e.g., a utility/shore power source, a solar power source, a wind power source, a fuel cell power source, a battery power source, an APU, etc.).

In another example, the executive control strategy can include anticipating whether a particular refrigerated transport unit at the site may require use of a particular power source (e.g., a utility/shore power source, a prime mover, a solar power source, a wind power source, a fuel cell power source, a battery power source, an APU, etc.) at a desired future time and can coordinate operation of the other refrigerated transport units so that the particular refrigerated transport unit can use the particular power source at the desired future time.

The method 400 then proceeds to 420.

At 420, the controller distributes the executive control strategy generated at 415 to each of the refrigerated transport units at the operation site. When the controller is a TRS controller, the TRS controller can distribute the executive control strategy to TRS controllers of refrigerated transport units that are in close proximity using a short distance wireless communication protocol (e.g., ZigBee, Bluetooth, infrared, a radio enabled protocol, a power line communication protocol, a Wi-Fi protocol, etc.). Those TRS controllers can then relay the executive control strategy to other TRS controllers of other refrigerated transport units using a short distance wireless communication protocol. Accordingly, the TRS controller can effective broaden transmission coverage for distributing the executive control strategy without, for example, increasing a transmitter power, using a long distance wireless protocol, etc. In some embodiments, the TRS controller can distribute the executive control strategy to TRS controllers of other refrigerated transport units at the operation site using a long distance wireless communication protocol (e.g., a cellular communication protocol). When the controller is part of a control center, the control center can distribute the executive control strategy to TRS controllers of the refrigerated transport units using a long distance wireless communication protocol. In some embodiments, the control center can distribute the executive control strategy to one or more TRS controllers using a short distance wireless communication protocol and then those TRS controller(s) can relay the executive control strategy to other TRS controllers at the operation site using the short distance wireless communication protocol. The method 400 then proceeds to 425.

At 425, the controller operates the TRS of the first refrigerated transport unit based on the executive control strategy. It will be appreciated that a TRS controller of each of the refrigerated transport units that are in close proximity (directly or indirectly) can be operated based on the executive control strategy.

For example, when the controller is a TRS controller of the first refrigerated transport unit, the TRS controller can control operation of the TRS (e.g., operation of the refrigerant compressor of the TRS) of each of the refrigerated transport units based on the executive control strategy. In another example, when the controller is part of a control center, the controller can control operation of the TRS (e.g., operation of the refrigerant compressor of the TRS) of each of the refrigerated transport units by sending instructions to each of the TRS controllers on how to operate based on the executive control strategy.

ASPECTS

It will be appreciated that any of aspects 1-7, 8-14 and 15-20 can be combined.

Aspect 1. A method of coordinating operation of a first transport refrigeration system (TRS) with one or more other TRSs, the first TRS controlling an environmental condition within an internal space of a first transport unit and each of the one or more other TRSs controlling an environmental condition within an internal space of another transport unit, the method comprising:

a controller determining whether the first transport unit is stationary;

the controller identifying whether the first transport unit is in close proximity of a second transport unit when the controller determines that the transport unit is stationary;

the controller determining an executive control strategy for controlling the first TRS in coordination with a second TRS that controls an environmental condition within an internal space of the second transport unit when the controller identifies that the first transport unit is in close proximity of the second transport unit; and the controller operating the first TRS based on the executive control strategy.

Aspect 2. The method of aspect 1, wherein the executive control strategy includes preventing simultaneous startup of the first TRS and the second TRS when both the first TRS and the second TRS are being powered by a utility/shore power source, and wherein the controller operating the first TRS based on the executive control strategy includes the controller preventing startup of the first TRS during startup of the second TRS when both the first TRS and the second TRS are being powered by the utility/shore power source.

Aspect 3. The method of either of aspects 1 and 2, wherein the first TRS includes a refrigeration circuit that includes a refrigerant compressor operable in a cycle sentry mode in which the refrigerant compressor is turned on for a first period of time and turned off for a second period of time,
wherein the executive control strategy includes staggering operation of the cycle sentry mode of the first TRS and a cycle sentry mode of the second TRS to reduce an amount of time that the refrigerant compressor of the first TRS is turned on while the second TRS is turned on, and
wherein the controller operating the first TRS based on the executive control strategy includes the controller coordinating operation of the refrigerant compressor of the first TRS with operation of the second TRS to reduce the amount of time that the refrigerant compressor of the first TRS is turned on while the second TRS is turned on.

Aspect 4. The method of any of aspects 1-3, wherein the first TRS includes a refrigeration circuit that includes a refrigerant compressor, the refrigerant compressor operable to be powered by a prime mover and a utility/shore power source,
wherein the executive control strategy includes the first TRS powering the refrigerant compressor using the utility/shore power source when a cost for the utility/shore power source is lower than a cost threshold, and
wherein the controller operating the first TRS based on the executive control strategy includes the controller instructing the first TRS to power the refrigerant compressor using the utility/shore power source when the cost for the utility/shore power source is cheaper than the cost threshold and instructing the first TRS to power the refrigerant compressor using the prime mover when the cost for the utility/shore power source is greater than the cost threshold.

Aspect 5. The method of any of aspects 1-4, wherein the first TRS includes a refrigeration circuit that includes a refrigerant compressor, the refrigerant compressor operable to be powered by a utility/shore power source,
wherein the executive control strategy includes the first TRS powering the refrigerant compressor using the utility/shore power source to subcool a cargo within the first transport unit when a cost for the utility/shore power source is lower than a cost threshold, and
wherein the controller operating the first TRS based on the executive control strategy includes the controller instructing the first TRS to power the refrigerant compressor using the utility/shore power source to subcool the cargo within the first transport unit when the cost for the utility/shore power source is cheaper than the cost threshold.

Aspect 6. The method of any of aspects 1-5, wherein the controller is a first controller of the first TRS, and
the method further including:
the first controller establishing communication with a second controller of the second TRS when the first transport unit is determined to be in close proximity to the second transport unit;
the first controller receiving second TRS priority information of the second TRS from the second controller;
the first controller determining the executive control strategy based on first TRS priority information of the first TRS and the second TRS priority information.

Aspect 7. The method of any of aspects 1-5, wherein the controller is part of control center that is separate from the first TRS and the second TRS, and
wherein the controller operating the TRS based on the executive control strategy includes the controller sending an executive control strategy instruction to a first controller of the first TRS,
the method further including:
the controller establishing communication with the first controller and the second controller;
the controller receiving first TRS priority information of the first TRS from the first controller and receiving second TRS priority information of the second TRS from the second controller;
the controller determining the executive control strategy based on the first TRS priority information and the second TRS priority information.

Aspect 8. A coordinated control system comprising:
a first refrigerated transport unit including:
a first transport unit having an internal space, and
a first transport refrigeration system (TRS) that controls an environmental condition within an internal space of the first transport unit; and a controller configured to:
determine whether the first transport unit is stationary,
identify whether the first transport unit is in close proximity of a second transport unit when the controller determines that the first transport unit is stationary, and
determine an executive control strategy for controlling the first TRS iii coordination with a second TRS of a second refrigerated transport unit when the controller identifies that the first transport unit is in close proximity of the second transport unit, wherein the second TRS controls an internal space of a second transport unit;
wherein the first TRS is configured to control the environmental condition within the transport unit based on the executive control strategy.

Aspect 9. The coordinated control system of aspect 8, wherein the controller is configured to, based on the executive control strategy, prevent simultaneous startup of the TRS and the second TRS when both the first TRS and the second TRS are being powered by a utility/shore power source.

Aspect 10. The coordinated control system of either one of aspects 8 or 9, wherein the first TRS includes a refrigeration circuit that includes a refrigerant compressor operable in a cycle sentry mode in which the refrigerant compressor is turned on for a first period of time and turned off for a second period of time,
wherein the executive control strategy includes staggering operation of the cycle sentry mode of the first TRS and a cycle sentry mode of the second TRS to reduce an amount of time that the refrigerant compressor of the first TRS is turned on while the second TRS is turned on, and
wherein the controller is configured, based on the executive control strategy, to stagger operation of the cycle sentry mode of the first TRS and a cycle sentry mode of the second TRS based on the executive control strategy to reduce an amount of time that the refrigerant compressor of the first TRS and a refrigerant compressor of the second TRS are turned on.

Aspect 11. The coordinated control system of any of aspects 8-10, wherein the first TRS includes a refrigeration circuit that includes a refrigerant compressor operable to be powered by a prime mover and an utility/shore power source,
wherein the executive control strategy includes the first TRS powering the refrigerant compressor using the utility/shore power source when a cost for the utility/shore power source is lower than a cost threshold, and wherein the controller is configured, based on the executive control strategy, to:
  instruct the first TRS to power the refrigerant compressor using the utility/shore power source when the cost for the utility/shore power source is cheaper than the cost threshold, and
  instruct the first TRS to power the refrigerant compressor mine the prime mover when the cost for the utility/shore power source is greater than the cost threshold.

Aspect 12. The coordinated control system of any of aspects 8-11, wherein the first TRS includes a refrigeration circuit that includes a refrigerant compressor operable to be powered by a utility/shore power source,
  wherein the executive control strategy includes the first TRS powering the refrigerant compressor using the utility/shore power source to subcool a cargo within the first transport unit when a cost for the utility/shore power source is lower than a cost threshold, and
  wherein the controller is configured, based on the control strategy, to instruct the first TRS to power the refrigerant compressor using the utility/shore power source to subcool the cargo within the first transport unit when the cost for the utility/shore power source is cheaper than the cost threshold.

Aspect 13. The coordinated control system of any of aspects 8-12, wherein the controller is a TRS controller of the first TRS, and
  wherein the TRS controller is configured to:
  establish communication with a second TRS controller of the second TRS when the transport unit is determined to be in close proximity to the second transport unit,
  receive second TRS priority information of the second TRS from the second TRS controller, and
  determine the executive control strategy based on TRS priority information of the first TRS and the second TRS priority information.

Aspect 14. The coordinated control system of any of aspects 8-12, wherein the controller is part of a control center separate from the first TRS, and
  wherein the control center is configured to:
  establish communication with a first TRS controller of the first TRS and a second TRS controller of the second TRS;
  receive first TRS priority information from the first TRS controller and second TRS priority information from the second TRS controller;
  the controller determining the executive control strategy based on the first TRS priority information and the second TRS priority information.

Aspect 15. A transport refrigeration system (TRS) for controlling an environmental condition within an internal space of a transport unit, the TRS comprising:
  a refrigeration circuit that includes a refrigerant compressor, the refrigerant compressor operable to be powered by a utility/shore power source; and
  a controller configured to:
  determine whether the transport unit is stationary,
  identify whether the transport unit is in close proximity of a second transport unit when the controller determines that the transport unit is stationary,
  determine an executive control strategy for controlling the TRS in coordination with a second TRS, the second TRS controlling an environmental condition within an internal space of the second transport unit, when the controller identifies that the transport unit is in close proximity of the second transport unit, and
  control operation of the refrigeration circuit based on the executive control strategy.

Aspect 16. The TRS of aspect 15, wherein the controller is configured to, based on the executive control strategy, prevent simultaneous startup of the TRS and the second TRS when both the first TRS and the second TRS are being powered by a utility/shore power source.

Aspect 17. The TRS of either one of aspect 15 or 16, wherein the refrigeration circuit includes a refrigerant compressor operable in a cycle sentry mode in which the refrigerant compressor is turned on for a first period of time and turned off for a second period of time,
  wherein the executive control strategy includes staggering operation of the cycle sentry mode of the first TRS and a cycle sentry mode of the second TRS to reduce an amount of time that the refrigerant compressor of the first TRS is turned on while the second TRS is turned on, and
  wherein the controller is configured, based on the executive control strategy, to stagger operation of the cycle sentry mode of the TRS and a cycle sentry mode of the second TRS based on the executive control strategy to reduce an amount of time that the refrigerant compressor of the TRS and a refrigerant compressor of the second TRS are turned on.

Aspect 18. The TRS of any of aspects 15-17, wherein the refrigeration circuit includes a refrigerant compressor, the refrigerant compressor operable to be power ed by a prime mover and a utility/shore power source, and
  wherein the executive control strategy includes the first TRS powering the refrigerant compressor using the utility/shore power source when a cost for the utility/shore power source is lower than a cost threshold, and
  wherein the controller is configured, based on the executive control strategy, to:
  instruct the TRS to power the refrigerant compressor using the utility/shore power source when the cost for the utility/shore power source is cheaper than the cost threshold, and
  instruct the TRS to power the refrigerant compressor using the prime mover when the cost for the utility/shore power source is greater than the cost threshold.

Aspect 19. The TRS of any of aspects 15-18, wherein the refrigeration circuit includes a refrigerant compressor, the refrigerant compressor operable to be powered by a utility/shore power source,
  wherein the executive control strategy includes the first TRS powering the refrigerant compressor using the utility/shore power source to subcool a cargo within the first transport unit when a cost for the utility/shore power source is lower than a cost threshold, and
  wherein the controller is configured, based on the executive control strategy, to instruct the first TRS to power the refrigerant compressor using the utility/shore power source to subcool the cargo within the first transport unit when the cost for the utility/shore power source is cheaper than the cost threshold.

Aspect 20. The TRS of any of aspects 15-19, wherein the controller is configured to:
  communicate with a control center that is separate from the TRS,
  receive priority information from the control center, and
  determine the executive control strategy based on the priority information.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coordinating operation of a first transport refrigeration system (TRS) with one or more other TRSs, the first TRS controlling an environmental condition within an internal space of a first transport unit and each of the one or more other TRSs controlling an environmental condition within an internal space of another transport unit, the method comprising:
    a controller determining whether the first transport unit is stationary;
    the controller identifying whether the first transport unit is in close proximity of a second transport unit when the controller determines that the first transport unit is stationary;
    the controller determining an executive control strategy for controlling the first TRS in coordination with a second TRS that controls an environmental condition within an internal space of the second transport unit when the controller identifies that the first transport unit is in close proximity of the second transport unit; and
    the controller operating the first TRS based on the executive control strategy.

2. The method of claim 1, wherein the executive control strategy includes preventing simultaneous startup of the first TRS and the second TRS when both the first TRS and the second TRS are being powered by a utility/shore power source, and
    wherein the controller operating the first TRS based on the executive control strategy includes the controller preventing startup of the first TRS during startup of the second TRS when both the first TRS and the second TRS are being powered by the utility/shore power source.

3. The method of claim 1, wherein the first TRS includes a refrigeration circuit that includes a refrigerant compressor operable in a cycle sentry mode in which the refrigerant compressor is turned on for a first period of time and turned off for a second period of time,
    wherein the executive control strategy includes staggering operation of the cycle sentry mode of the first TRS and a cycle sentry mode of the second TRS to reduce an amount of time that the refrigerant compressor of the first TRS is turned on while the second TRS is turned on, and
    wherein the controller operating the first TRS based on the executive control strategy includes the controller coordinating operation of the refrigerant compressor of the first TRS with operation of the second TRS to reduce the amount of time that the refrigerant compressor of the first TRS is turned on while the second TRS is turned on.

4. The method of claim 1, wherein the first TRS includes a refrigeration circuit that includes a refrigerant compressor, the refrigerant compressor operable to be powered by a prime mover and a utility/shore power source,
    wherein the executive control strategy includes the first TRS powering the refrigerant compressor using the utility/shore power source when a cost for the utility/shore power source is lower than a cost threshold, and
    wherein the controller operating the first TRS based on the executive control strategy includes the controller instructing the first TRS to power the refrigerant compressor using the utility/shore power source when the cost for the utility/shore power source is cheaper than the cost threshold and instructing the first TRS to power the refrigerant compressor using the prime mover when the cost for the utility/shore power source is greater than the cost threshold.

5. The method of claim 1, wherein the first TRS includes a refrigeration circuit that includes a refrigerant compressor, the refrigerant compressor operable to be powered by a utility/shore power source,
    wherein the executive control strategy includes the first TRS powering the refrigerant compressor using the utility/shore power source to subcool a cargo within the first transport unit when a cost for the utility/shore power source is lower than a cost threshold, and
    wherein the controller operating the first TRS based on the executive control strategy includes the controller instructing the first TRS to power the refrigerant compressor using the utility/shore power source to subcool the cargo within the first transport unit when the cost for the utility/shore power source is cheaper than the cost threshold.

6. The method of claim 1, wherein the controller is a first controller of the first TRS, and
    the method further including:
        the first controller establishing communication with a second controller of the second TRS when the first transport unit is determined to be in close proximity to the second transport unit;
        the first controller receiving second TRS priority information of the second TRS from the second controller;
        the first controller determining the executive control strategy based on first TRS priority information of the first TRS and the second TRS priority information.

7. The method of claim 1, wherein the controller is part of a control center that is separate from the first TRS and the second TRS, and
    wherein the controller operating the TRS based on the executive control strategy includes the controller sending an executive control strategy instruction to a first controller of the first TRS,
    the method further including:
        the controller establishing communication with the first controller and a second controller of the second TRS;
        the controller receiving first TRS priority information of the first TRS from the first controller and receiving second TRS priority information of the second TRS from the second controller;
        the controller determining the executive control strategy based on the first TRS priority information and the second TRS priority information.

8. A coordinated control system comprising:
    a first refrigerated transport unit including:
        a first transport unit having an internal space, and
        a first transport refrigeration system (TRS) that controls an environmental condition within an internal space of the first transport unit; and
    a controller configured to:
        determine whether the first transport unit is stationary,
        identify whether the first transport unit is in close proximity of a second transport unit when the controller determines that the first transport unit is stationary, and
        determine an executive control strategy for controlling the first TRS iii coordination with a second TRS of a second refrigerated transport unit when the controller identifies that the first transport unit is in close proximity of the second transport unit, wherein the second TRS controls an internal space of a second transport unit;

wherein the first TRS is configured to control the environmental condition within the transport unit based on the executive control strategy.

9. The coordinated control system of claim 8, wherein the controller is configured to, based on the executive control strategy, prevent simultaneous startup of the TRS and the second TRS when both the first TRS and the second TRS are being powered by a utility/shore power source.

10. The coordinated control system of claim 8, wherein the first TRS includes a refrigeration circuit that includes a refrigerant compressor operable in a cycle sentry mode in which the refrigerant compressor is turned on for a first period of time and turned off for a second period of time, wherein the executive control strategy includes staggering operation of the cycle sentry mode of the first TRS and a cycle sentry mode of the second TRS to reduce an amount of time that the refrigerant compressor of the first TRS is turned on while the second TRS is turned on, and wherein the controller is configured, based on the executive control strategy, to stagger operation of the cycle sentry mode of the first TRS and a cycle sentry mode of the second TRS based on the executive control strategy to reduce an amount of time that the refrigerant compressor of the first TRS and a refrigerant compressor of the second TRS are turned on.

11. The coordinated control system of claim 8, wherein the first TRS includes a refrigeration circuit that includes a refrigerant compressor operable to be powered by a prime mover and an utility/shore power source, wherein the executive control strategy includes the first TRS powering the refrigerant compressor using the utility/shore power source when a cost for the utility/shore power source is lower than a cost threshold, and wherein the controller is configured, based on the executive control strategy, to:
  instruct the first TRS to power the refrigerant compressor using the utility/shore power source when the cost for the utility/shore power source is cheaper than the cost threshold, and
  instruct the first TRS to power the refrigerant compressor using the prime mover when the cost for the utility/shore power source is greater than the cost threshold.

12. The coordinated control system of claim 8, wherein the first TRS includes a refrigeration circuit that includes a refrigerant compressor operable to be powered by a utility/shore power source, wherein the executive control strategy includes the first TRS powering the refrigerant compressor using the utility/shore power source to subcool a cargo within the first transport unit when a cost for the utility/shore power source is lower than a cost threshold, and wherein the controller is configured, based on the control strategy, to instruct the first TRS to power the refrigerant compressor using the utility/shore power source to subcool the cargo within the first transport unit when the cost for the utility/shore power source is cheaper than the cost threshold.

13. The coordinated control system of claim 8, wherein the controller is a TRS controller of the first TRS, and wherein the TRS controller is configured to:
  establish communication with a second TRS controller of the second TRS when the transport unit is determined to be in close proximity to the second transport unit,
  receive second TRS priority information of the second TRS from the second TRS controller, and
  determine the executive control strategy based on TRS priority information of the first TRS and the second TRS priority information.

14. The coordinated control system of claim 8, wherein the controller is part of a control center separate from the first TRS, and wherein the control center is configured to:
  establish communication with a first TRS controller of the first TRS and a second TRS controller of the second TRS;
  receive first TRS priority information from the first TRS controller and second TRS priority information from the second TRS controller;
  the controller determining the executive control strategy based on the first TRS priority information and the second TRS priority information.

15. A transport refrigeration system (TRS) for controlling an environmental condition within an internal space of a transport unit, the TRS comprising:
  a refrigeration circuit that includes a refrigerant compressor, the refrigerant compressor operable to be powered by a utility/shore power source; and
  a controller configured to:
    determine whether the transport unit is stationary,
    identify whether the transport unit is in close proximity of a second transport unit when the controller determines that the transport unit is stationary,
    determine an executive control strategy for controlling the TRS in coordination with a second TRS, the second TRS controlling an environmental condition within an internal space of the second transport unit, when the controller identifies that the transport unit is in close proximity of the second transport unit, and
    control operation of the refrigeration circuit based on the executive control strategy.

16. The TRS of claim 15, wherein the controller is configured to, based on the executive control strategy, prevent simultaneous startup of the TRS and the second TRS when both the TRS and the second TRS are being powered by a utility/shore power source.

17. The TRS of claim 15, wherein the refrigeration circuit includes a refrigerant compressor operable in a cycle sentry mode in which the refrigerant compressor is turned on for a first period of time and turned off for a second period of time, wherein the executive control strategy includes staggering operation of the cycle sentry mode of the TRS and a cycle sentry mode of the second TRS to reduce an amount of time that the refrigerant compressor of the TRS is turned on while the second TRS is turned on, and wherein the controller is configured, based on the executive control strategy, to stagger operation of the cycle sentry mode of the TRS and a cycle sentry mode of the second TRS based on the executive control strategy to reduce an amount of time that the refrigerant compressor of the TRS and a refrigerant compressor of the second TRS are turned on.

18. The TRS of claim 15, wherein the refrigeration circuit includes a refrigerant compressor, the refrigerant compressor operable to be powered by a prime mover and a utility/shore power source, and wherein the executive control strategy includes the TRS powering the refrigerant compressor using the utility/shore power source when a cost for the utility/shore power source is lower than a cost threshold, and wherein the controller is configured, based on the executive control strategy, to:

instruct the TRS to power the refrigerant compressor using the utility/shore power source when the cost for the utility/shore power source is cheaper than the cost threshold, and instruct the TRS to power the refrigerant compressor using the prime mover when the cost for the utility/shore power source is greater than the cost threshold.

19. The TRS of claim 15, wherein the refrigeration circuit includes a refrigerant compressor, the refrigerant compressor operable to be powered by a utility/shore power source, wherein the executive control strategy includes the TRS powering the refrigerant compressor using the utility/shore power source to subcool a cargo within the first transport unit when a cost for the utility/shore power source is lower than a cost threshold, and wherein the controller is configured, based on the executive control strategy, to instruct the TRS to power the refrigerant compressor using the utility/shore power source to subcool the cargo within the first transport unit when the cost for the utility/shore power source is cheaper than the cost threshold.

20. The TRS of claim 15, wherein the controller is configured to:

communicate with a control center that is separate from the TRS, receive priority information from the control center, and determine the executive control strategy based on the priority information.

* * * * *